United States Patent [19]  [11] 4,008,094
Beall et al.  [45] Feb. 15, 1977

[54] HIGH DURABILITY, REINFORCING FIBERS FOR CEMENTITIOUS MATERIALS

[75] Inventors: George H. Beall, Big Flats; Hermann L. Rittler, Horseheads, both of N.Y.

[73] Assignee: Corning Glass Works, Corning, N.Y.

[22] Filed: July 16, 1975

[21] Appl. No.: 596,432

[52] U.S. Cl. .................................. 106/99; 106/50; 106/52

[51] Int. Cl.$^2$ ................. C04B 31/06; C03C 13/00; C03C 3/04

[58] Field of Search ......................... 106/52, 50, 99

[56] References Cited

UNITED STATES PATENTS

| | | | |
|---|---|---|---|
| 3,557,575 | 1/1971 | Beall | 106/39.6 |
| 3,736,162 | 5/1973 | Choalovsky et al. | 106/99 |
| 3,783,092 | 1/1974 | Majumdar | 106/50 |
| 3,861,926 | 1/1975 | Irlam | 106/50 |

*Primary Examiner*—Winston A. Douglas
*Assistant Examiner*—Mark Bell
*Attorney, Agent, or Firm*—Clinton S. Janes, Jr.; Clarence R. Patty, Jr.

[57] ABSTRACT

This invention relates to the production of vitreous fibrous materials exhibiting excellent resistance to alkaline attack. More particularly, the instant invention is directed to the production of fibers consisting essentially of basalt and zirconia which demonstrate such exceptional resistance to attack from the basic components present in such calcareous cementitious materials as portland cement as to render them especially useful as reinforcing elements in cementitious materials.

6 Claims, No Drawings

HIGH DURABILITY, REINFORCING FIBERS FOR CEMENTITIOUS MATERIALS

Research of considerable magnitude has been relatively continuous over the past 35-40 years in the use of glass fibers as reinforcing elements for many different matrices. Thus, the inherent high intrinsic strength of glass can lead to greatly improved mechanical strength of the host material, expecially where the fibers are embedded in such a manner as to be oriented in the plane parallel to the direction of stress. Plastics, elastomers, concretes, and metals have been investigated as host materials for glass fibers.

The use of fiber reinforcement in cementitious materials has been studied extensively in view of laboratory testing and field experience which have indicated that a great improvement in mechanical strength can be enjoyed where a relatively minor amount of glass fibers is incorporated within the body, and particularly is this so where the fibers are enclosed within or slightly below the surface of the article. However, the glass fibers investigated previously as reinforcing elements for cements and concretes have demonstrated a lack of resistance to chemical attack from the ingredients of the cements. Thus, the common cements, such as portland cement, provide an alkaline environment when in contact with water. The lack of resistance displayed by the commercially-marketed glass fibers to attack from such an environment has militated against their extensive use in such an application. Glasses resistant to alkaline environments are known to the glass art but the difficulty in producing such glasses as fibers and/or their intrinsic cost have essentially removed them from consideration in this application.

Therefore, the principal objective of the present invention is to provide relatively low cost glass compositions which can be readily drawn into fibers and which exhibit exceptional resistance to alkaline environments and, particularly, resistance to attack from the calcareous components present in such cementitious materials as portland cement.

We have discovered that this objective can be accomplished utilizing glass compositions consisting essentially of basalt and zirconia ($ZrO_2$), the amount of zirconia ranging between about 1-15% by weight.

A rather extensive discussion of basalt, including a review of its chemical composition, microstructure, and physical characteristics, is provided in U.S. Pat. No. 3,557,575, of which the present applicants are the patentees, and reference is hereby made to that patent for that discussion. As is explained therein, there are several types of basalts with considerable variation in composition between the several types. In general, the major constituents, from a chemical analysis standpoint, will be $SiO_2$, $Al_2O_3$, MgO, CaO, and iron oxides. Minor amounts of other ingredients such as $Na_2O$, $K_2O$, and $TiO_2$ can also be present. Nevertheless, although the compositional differences between the various types of basalt can be great, the compositional variation within a particular type of basalt will not be. This fact is illustrated in the analyses set out in the patent of the three major types of basalt, viz., tholeiites, olivine tholeiites, and alkali basalts. Hence, whereas there are considerable differences in base composition existing between the three types, there is very little variation between samples of each type, although the samples were taken from widely-dispersed parts of the world. However, as is observed in the patent, tholeiitic basalts possess two advantages which are useful in manufacturing processes founded upon the melting of basalt. First, flows of tholeiitic basalts are very extensive and their compositions are extraordinarily uniform. Second, this type of basalt appears to have the lowest liquidus temperatures of the common basalt types, which factor is of high significance in glassmaking technology.

U.S. Pat. No. 3,557,575 described a method for making glass-ceramic articles employing basalt as the starting material. The method involved three general steps. First, a basalt containing at least 5% by weight $Fe_2O_3$ was melted. Second, the melt was cooled and formed into a glass shape. Third, the glass shape was heat treated in a prescribed manner to cause the growth of uniformly fine-grained crystals therein. Thus, steps 1 and 2 of the patented process contemplated the formation of a basalt glass and, in so doing, could imply the production of basalt glass fibers. Nevertheless, the objective of the patentees was to produce a glass-ceramic body which would have physical properties superior to those demonstrated by the basalt glass. Thus, the glass-ceramic articles were stronger, harder, and more resistant to chemical attack than naturally-occurring basalt or a fusion cast basalt material. Such bodies did, indeed, display greater resistance to acid and alkaline solutions, it being noted that the weight loss evidenced in the conventional durability tests utilizing hydrochloric acid and sodium carbonate solutions was frequently only about one-third that of basalt glass.

Yet, for the high volume application of fiber reinforcement of cementitious materials, a low cost product of even greater resistance to alkaline environments, and particularly to the calcareous ingredients conventionally present in cements, was demanded. It can be appreciated that the heat treatment step required to convert the basalt glass to a glass-ceramic adds to the total cost of the final product.

We have found that these desiderata can be secured in glass fibers consisting essentially, by weight, of about 85-99% basalt and 1-15% $ZrO_2$. Basically, the process of the invention contemplates two steps. First, a mixture of basalt rock and zirconia is melted in crucibles, pots, or continuous glass melting tanks, depending upon the quantity of product desired. Second, when the melt becomes homogeneous, glass fibers are made therefrom via such conventional means as drawing, spinning, blowing, etc. Since orientation of the fibers is normally desired in the cement matrix, the preferred means for producing the fibers will involve a drawing technique.

Table I sets out several examples, expressed in weight percent, which delineate the scope of the instant invention. Although the basic composition of the basalt is not critical to the operability of the invention, better chemical durability can be achieved where a basalt of low alkali content, i.e., less than about 5% $R_2O$ is employed. In the following examples, a tholeiitic basalt from Westfield, Mass. having the approximate analysis reported below in weight percent was employed in each example.

| | |
|---|---|
| $SiO_2$ | 52.0 |
| $TiO_2$ | 1.0 |
| $Al_2O_3$ | 14.1 |
| MgO | 6.4 |
| CaO | 9.3 |
| $Na_2O$ | 3.2 |
| $K_2O$ | 1.2 |

-continued

| Total Fe as Fe$_2$O$_3$ | 12.8 |

This basalt was utilized because of its ready availability and the fact that the composition thereof has been found to be remarkably uniform even for a tholeiitic basalt. The basalt was crushed to pass a No. 50 United States Standard Sieve (297 microns) and then blended with ZrO$_2$ having a grain size of less than 1 micron. The fine size of the particles, particularly the ZrO$_2$, greatly expedited the achieving of a homogeneous melt although, of course, larger granules can be successfully employed. The mixtures were then placed into platinum crucibles and transferred to a gas-fired furnace operating at about 1500° C. After maintaining that temperature for about six hours, a homogeneous melt was secured and a continuous draw of glass fiber, the diameter of which was varied between about 10–200 microns, was wound onto a steel drum. A patty of glass was also poured onto a steel plate, samples of which were used for the determination of the various physical properties recorded in Table II. Conducting the melting operation in an oxidizing atmosphere is preferred, although a neutral atmosphere can be utilized if oxidizing agents such as NH$_4$NO$_3$ or (NH$_4$)$_2$SO$_4$ are included in the batch, or if air is bubbled through the molten batch.

TABLE I

|        | 1   | 2  | 3  | 4  | 5  |
|--------|-----|----|----|----|----|
| Basalt | 100 | 95 | 90 | 85 | 70 |
| ZrO$_2$ | —   | 5  | 10 | 15 | 30 |

Examples 1–4 provided good homogeneous melts. Example 5 was more viscous than would be desirable in conventional melting and forming practice and contained unmelted ZrO$_2$ grains, thereby resulting in an inhomogeneous melt. Whereas higher melting temperature could, perhaps, eliminate the unmelted ZrO$_2$ grains, from the separate points of view of melting practice and resistance to alkaline attack, an addition of up to about 15% ZrO$_2$ appears to comprise a practical maximum.

The common hydraulic cements of commerce contemplate a calcareous base. For example, portland cement is generally considered to be a mixture of 3 CaO.SiO$_2$, 3 CaO.Al$_2$O$_3$, and 2 CaO.SiO$_2$ which is prepared by heating a calcareous material (limestone, marl, or chalk) with an argillaceous material (clay or shale) to vitrification. The resulting clinker is ground together with a small amount of gypsum. The final composition approximates about 62–67% CaO, 18–20% SiO$_2$, 4–8% Al$_2$O$_3$, 2–3% Fe$_2$O$_3$, 1–4% MgO, and 0.5–1% Na$_2$O and/or K$_2$O.

As can be appreciated, when water is added to the cement, an alkaline mixture is formed which will attack reinforcing elements, such as fibers, included in the mass. A common laboratory test to determine the resistance of glasses to alkaline attack involves contacting glass bodies 2 inches × 2 inches × 4 mm, having polished surfaces, with a 5% NaOH aqueous solution for six hours at 95° C. and then visually observing the polished surfaces and measuring the weight loss. A hazy or iridescent appearance indicates surface attack and the weight loss (milligrams/cm$^3$) provides a meaningful measure of such attack.

The cement industry has developed a test which is more directly related to the cement environment which will be encountered by the reinforcing elements. Such a test involves utilizing a saturated solution of Ca(OH)$_2$ in water which is believed to correlate reasonably well with the actual water plus cement mixture found in the cementitious mass. As shown in Table II below, glass bodies having polished surfaces, similar to those described above, were exposed to such a solution for three days at 50° C.

The other physical properties reported in Table II were determined in accordance with conventional measuring techniques. The coefficient of thermal expansion (× 10$^{-7}$/° C.) was measured over the range of 25°–300° C.; the density is expressed in grams/cm$^3$; the annealing point, strain point, and liquidus measurements were conducted in accordance with methods conventional in the glass art and are reported in ° C.; and the transmission to infrared radiation measurements employed samples having a thickness of four millimeters. Also included in Table II are a borosilicate glass widely utilized for laboratory ware, Corning 7740; an aluminosilicate glass reported by E. A. Shand, *Glass Engineering Handbook*, 2nd Edition, pages 4 and 96, as being resistant to alkalies, Corning 1720; and an alkali zirconosilicate glass specifically designed for resistance to alkali attack, Corning 7280; each glass being commercially marketed by Corning Glass Works, Corning, N.Y. Corning 7280 glass is both difficult to melt, due to batch solution problems, as well as to form, and is also very costly.

TABLE II

|                  | 1       | 2       | 3         | 4         | 5         | 7740    | 7280              | 1720    |
|------------------|---------|---------|-----------|-----------|-----------|---------|-------------------|---------|
| Expansion        | 70.0    | —       | 77.7      | 76.6      | 71.7      | 32.5    | 64.0              | 42.0    |
| Density          | 2.788   | 2.81    | 2.824     | 2.88      | 2.89      | 2.23    | 2.61              | 2.53    |
| Infrared         | 0       | 0       | 0         | 0         | 0         | —       | —                 | —       |
| 5% NaOH          |         |         |           |           |           |         |                   |         |
|   Appearance | Frosted | Frosted | Frosted | Frosted | Frosted | Frosted | Frosted | Frosted |
|   Weight Loss | 1.6 | 0.5 | 0.4 | 0.38 | 0.34 | 0.4 | 0.2 | 0.8–1.0 |
| Ca(OH)$_2$       |         |         |           |           |           |         |                   |         |
|   Appearance |   |   | No change | No change | No change | Frosted | Slightly Frosted |   |
|   Weight Loss |   |   | 0.03 |   | 0.03 | 0.4 | 0.02 |   |
| Annealing        | 640     | 645     | 661       |           |           | 560     | 624               | 712     |
| Strain           | 600     | 604     | 622       |           |           | 510     | 576               | 667     |
| Liquidus         | 1240    | 1320    | 1475      | >1500     | >1550     | 1084    | 1024              | 1141    |

It is believed that Table II unequivocally demonstrates the exceptional alkali resistance of the instant glasses. And this desirable behavior can be achieved in readily meltable and formable glasses utilizing basalt, an inexpensive raw material, as the basic glass ingredient. Although the presence of ZrO$_2$ in some finite amount will act to enhance the alkali resistance of the glass, at least about 1% by weight has been found necessary to provide substantial improvement in the alkali resistance. The continued increase in $ZrO_2$ content, of course, leads to further improvement in alkali resistance, as can be seen in the comparative Examples 2-5. However, from a cost standpoint, as well as increasing difficulty in melting and forming, the inclusion of more than about 15% $ZrO_2$ becomes practically unattractive. Therefore, except for particularly harsh environments, the preferred addition of $ZrO_2$ will range between about 2-10%.

Basalt glasses generally lend themselves to electric melting techniques, which factor is advantageous from an environmental pollution point of view, since volatilization from the molten batch can be kept to a minimum. The addition of $ZrO_2$ to the basalt glass results in a phase separation when the melt is cooled. Although the exact function of the phase separation is not fully understood, it is believed that the presence thereof is responsible for the greatly improved chemical durability.

As was observed above, the fibers of the instant invention are preferably drawn in an oxidizing atmosphere such as air. Nevertheless, other atmospheres, e.g., forming gas, $SO_2$, or steam, can be employed to cause reactions at the surface of fibers drawn from an oxidized melt which may improve the bonding between the fibers and the matrix material and/or the bonding between the fibers and the various sizing compounds commonly utilized in the fiber glass industry. Thus, it is conjectured that the iron, alkali metal, and/or alkaline earth metal constituents of the basalt compositions can be pre-reacted in this fashion to enhance the fiber-cement bond characteristics.

In a further embodiment of the invention, crystals exhibiting magnetism can be grown within the fibers. In general, these crystals will be developed by subjecting the glass fibers to temperatures somewhat above the annealing point of the glass, e.g., about 650°–900° C., in a neutral atmosphere or in forming gas or other reducing environment. It is possible to cause the growth of crystals in the fibers as the fiber is being drawn from the melt by maintaining the fiber in the proper atmosphere and range of temperatures before being cooled to room temperature. Commonly, however, the glass fibers are cooled to room temperature and then are exposed to temperatures within about 650°–900° C. for times as brief as 0.5 hour to initiate the growth of crystals in situ. The crystals develop within the interior portion of the fibers but the surface thereof remains amorphous. Because this glassy surface layer has a lower coefficient of thermal expansion than the crystallized interior portion, compressive stresses are set up therein which can lead to an improvement in the overall mechanical strength of the fibers.

In the preferred practice, an exposure time of about 1-4 hours is employed to grow magnetic crystals, e.g., magnetite ($Fe_3O_4$) and/or ulvospinel ($Fe_2TiO_2$) and/or some form of a solid solution involving magnetite and ulvospinel. The presence of the magnetic crystals can facilitate orientation of the fibers within a matrix material such as a portland cement. The amount of crystallization in the interior portion of the fibers is normally quite high, i.e., more than about 50% by volume. Crystallization periods longer than four hours do not deleteriously affect the fibers, but such are not necessary since essentially complete crystallization will be secured within four hours. Exposure temperatures much in excess of 900° C. ought to be avoided inasmuch as coarse-grained crystals of pyroxenes can develop. Crystal growth at temperatures much below about 650° C. becomes so slow as to be relatively impractical.

We claim:

1. Fibers demonstrating exceptional resistance to attack by alkaline solutions composed of a glass consisting essentially, by weight, of 85–99% tholeiitic basalt containing less than about 5% alkali metal oxides and 1–15% $ZrO_2$.

2. Fibers according to claim 1 wherein the interior of said glass contains magnetic crystals but the surface thereof is amorphous.

3. Fibers according to claim 2 wherein said crystals are magnetite and/or ulvospinel and/or a solid solution between magnetite and ulvospinel.

4. In the reinforcing of calcareous cementitious materials through the inclusion of fibers therein, the improvement comprising utilizing glass fibers exhibiting exceptional resistance to the aqueous solution present in the cementitious mass, said glass consisting essentially, by weight, of 85-99% tholeiitic basalt containing less than about 5% alkali metal oxides and 1–15% $ZrO_2$.

5. In the reinforcing of calcareous cementitious materials according to claim 4 wherein the interior of said glass fibers contains magnetic crystals but the surface thereof is amorphous.

6. In the reinforcing of calcareous cementitious materials according to claim 5 wherein said crystals are magnetite and/or ulvospinel and/or solid solution between magnetite and ulvospinel.

* * * * *